No. 859,523. PATENTED JULY 9, 1907.
L. D. ROWELL.
MAGNETIC CLUTCH.
APPLICATION FILED MAY 1, 1905.

2 SHEETS—SHEET 1.

Witnesses:
Inventor:
L. D. Rowell
By: Jones & Addington
Attorneys.

No. 859,523. PATENTED JULY 9, 1907.
L. D. ROWELL.
MAGNETIC CLUTCH.
APPLICATION FILED MAY 1, 1905.

2 SHEETS—SHEET 2.

Witnesses:
Robert H. Weir
W. Perry Hahn

Inventor:
L. D. Rowell
By Jones & Addington
Attorneys

UNITED STATES PATENT OFFICE.

LEWIS D. ROWELL, OF MILWAUKEE, WISCONSIN, ASSIGNOR TO CUTLER HAMMER CLUTCH COMPANY, OF MILWAUKEE, WISCONSIN, A CORPORATION OF WISCONSIN.

MAGNETIC CLUTCH.

No. 859,523.   Specification of Letters Patent.   Patented July 9, 1907.

Application filed May 1, 1906. Serial No. 258,161.

*To all whom it may concern:*

Be it known that I, LEWIS D. ROWELL, a citizen of the United States, residing at Milwaukee, in the county of Milwaukee and State of Wisconsin, have invented new and useful Improvements in Magnetic Clutches, of which the following is a full, clear, concise, and exact description, reference being had to the accompanying drawing, forming a part of this specification.

My invention relates to improvements in magnetic clutches, my object being to provide a clutch, whereby the driven member of the same may be gradually accelerated and after the driven member has attained substantially full speed, the two members of the clutch may be positively connected.

My invention is especially applicable for starting a generator or similar load, where the machine is brought up to speed, and the load is applied after full speed has been attained.

One means of accomplishing my object is to provide in the same clutch a magnetic coupling of the ordinary ring type and a friction type of clutch of special form. By means of this arrangement, a generator armature may be brought up to speed smoothly, and with a small expenditure of energy, and when the same has attained full speed, the coupling may be connected, thus affording a driving power for the load, which need not be applied until after the special friction clutch has been disconnected.

A further object of my invention is to obtain a lighter and smaller clutch for the same horse power; also to provide a more reliable clutch and one which is less liable to slip.

Figure 1:
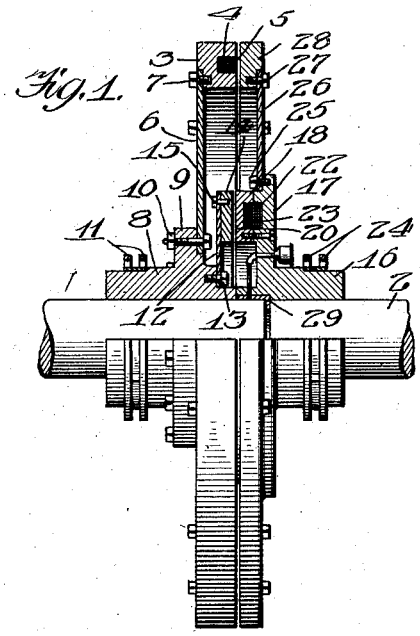
Figure 2:
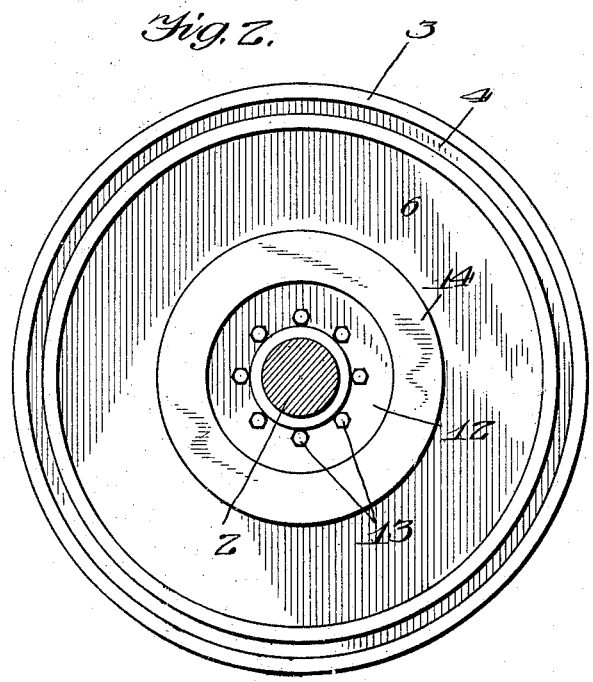
Figure 3:
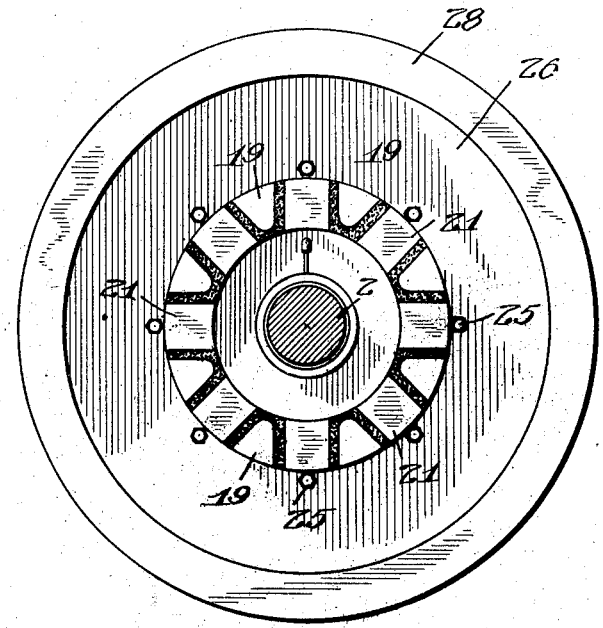
Figure 4:
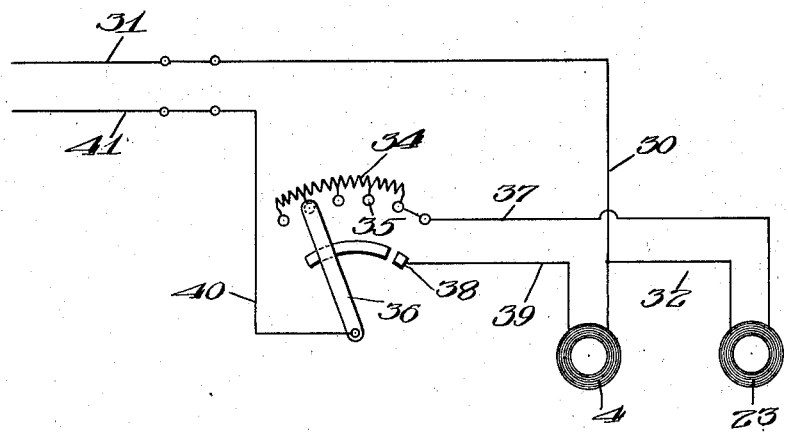

I have illustrated one form of my device in the accompanying drawings, in which:

Figure 1 is a side elevation, part of the clutch being shown in section; Fig. 2 is a face view of the left hand member of the clutch; Fig. 3 is a face view of the right hand member of my clutch; and; Fig. 4 is a diagrammatic view of the circuit arrangement of my clutch.

In the preferred embodiment of my invention, the driven and driving shafts are suitably mounted in such a manner that they aline, said shafts preferably having thrust collars or bearings whereby each is retained in its relative position in its bearings. Upon the abutting end of the shaft 1 is mounted one member of the clutch, and upon the opposing end of the other shaft 2 is mounted the opposite member of the clutch.

The coupling clutch consists preferably of a ring 3, having in its meeting face an annular channel or groove containing a magnet coil 4. A cover 5 preferably of sheet or thin copper fits within said groove to cover the magnetic coil. This ring is connected to a laterally yielding support preferably consisting of a spring metallic disk 6 to the outer edge of which the ring 3 is bolted by bolts 7, and having a central opening to receive the hub 8, keyed to the shaft and provided with a peripheral flange 9, to which the disk 6 is secured by the bolts 10. The hub carries collecting rings 11, suitably insulated therefrom and from each other, and which are respectively connected to the opposite ends of the coil 4 by suitable conductors which are insulated from the other parts. Also mounted upon the hub 8 is a second spring disk 12, which is secured to said hub by the bolts 13, and carries the annular armature member 14, secured thereto by bolts. The other member of my clutch is keyed upon the shaft 2 and comprises a hub 16 upon which is formed the annular flange 17. This flange 17 forms a back plate to which two rings are secured. One of these rings 18 is provided with inwardly extending pole pieces 19, 19, which in the present instance are substantially triangular in shape. The other ring 20 is provided with radially extending pole pieces 21, 21, which as shown, are substantially rectangular in shape, and which when the rings are placed together, as shown in Figs. 1 and 3, are adapted to rest in the space between the triangular pole pieces above mentioned. An annular channel 22 is provided in the face of the flange 17 and the rings 18 and 20 when placed together form an annular channel which coöperates with the channel 22 to form a chamber for the reception of the annular winding 23 for this member of the clutch. The terminals of the winding or coil extend to suitable collecting rings 24, mounted upon the hub 16 whereby current may be supplied to said winding.

The spaces between the poles carried on the rings 3 and 6 are filled with Babbitt or other nonmagnetic material. This material serves to entirely inclose the winding and thus protect the same from injury. Moreover, the Babbitt metal affords to the polar faces a continuous frictional surface against which the face of the armature 14 is adapted to bear.

Also secured upon the flange 17 by the bolts 25, is a spring metallic disk 26 to the outer edge of which is secured by bolts 27 an annular armature member 28 for the clutch member 4. A bushing 29 fits in a suitable opening in the hub 16 and the end of the shaft 1 is adapted to fit in this bushing whereby the shafts 1 and 2 are held in alinement.

By the arrangement of the coil 23 between the ring 18 and 20, the exciting coil of this member of the clutch is entirely surrounded by iron, thus creating a large amount of induction established when the circuit through the coil is completed. The current in the energizing coil 23 and consequently the strength of the magnetic field will increase slowly and thus prevent instant acceleration of the driven member of the clutch. The driving torque of this clutch is due to friction between the face of the field and the opposing armature plate, and to the reaction between the magnetic field and eddy currents induced by it in the armature plate 14. This latter component of the driving torque is a maximum when the driven member is at rest, and the driving member revolving at full speed, and drops off as the driven member attains speed; thus lessening of the induction component of torque acting to facilitate smooth acceleration. Furthermore, the arrangement of the outer and inner rings 18 and 20 provides a field magnet which is subdivided into a large number of smaller magnetic fields. These fields set up in armature plate 14, magnetic paths which oppose each other, thereby causing the residual magnetism to disappear more readily than would be the case if a single magnetic field were used. This causes the clutch to release quickly when the current has been shut off from the energizing coil.

In Fig. 4 I have illustrated diagrammatically the circuit arrangement whereby the gradually accelerating clutch may be energized through a resistance which may be gradually cut out, and when the final position of the lever has been reached, the gradually accelerating clutch is cut out and the coupling clutch is cut in circuit. In said figure it will be noted that one terminal of the winding 4 is connected by conductor 30 with the side 31 of the supply circuit, and one terminal of the winding 23 is also connected with the side 31 of the supply circuit by means of conductors 32 and 30. A resistance 34 is provided which is subdivided into sections connected with the contact points 35 over which the contact arm 36 is adapted to move. This resistance 34 is connected by conductor 37 with the opposite terminal of the clutch winding 23. A contact 38 is connected by the conductor 39 with one terminal of the clutch winding 4, and this contact 38 is adapted to be engaged when the arm 36 has been moved to its final position. The hub of the arm 36 is connected by conductor 40 with one side 41 of the supply main.

The operation of the device will be readily understood. When it is desired to start the driven mechanism, the movable element 36 is moved to the right whereby circuit will be closed from the main 41 by conductor 40 to the contact arm 36, through resistance 34, by conductor 37, to winding 23, and thence by conductors 32 and 30 to the opposite side 31 of the supply main. The winding will thereby be energized and the driven mechanism started. By the peculiar construction of the clutch the driven member of the clutch will attain speed gradually, and as the contact arm 36 is moved further to the right, cutting out the resistance, the speed of the driven member will increase until the driven member has attained full speed. After the driven member has attained full speed, the contact lever 36 will be moved still further to the right until the same rests upon the contact 38 when circuit will be closed through the winding 4, and the coupling member of the clutch will be thrown into operation. The circuit for this member may be readily traced from the supply main 41 by conductor 40, contact arm 36, contact 38, conductor 39, to winding 4 and thence by conductor 30 back to the opposite side 31 of the supply circuit. The winding 4 of this member being energized, the armature 28 will be attracted and the coupling will operate to firmly connect the driving and driven members of the clutch together.

I have shown in the diagrammatic Fig. 4 that the gradually accelerating clutch 23 is not cut out when the coupling is energized, but it will be understood that this may be readily accomplished if so desired.

By this construction of the clutch, I am enabled to build a lighter and smaller clutch for the same horse power. I am also enabled to avoid the necessary, heavy and expensive construction of a gradually accelerating type of clutch which will accommodate the full capacity of the machine. By this arrangement I am enabled to provide merely sufficient power in the gradually accelerating clutch to accelerate the device up to full speed. Furthermore, by the construction of my clutch a more reliable clutch device is provided as the parts of the coupling need not be lubricated and the liability of the members to slip is avoided.

Having thus described my invention, what I claim as new and desire to secure by Letters Patent is:

1. In a clutch, the combination with an accelerating portion operating through the combined influence of induction and friction, of a coupling portion operating through the influence of friction alone and arranged to be energized only after the driven member has attained substantially full speed.

2. In a clutch, the combination with a driven member and a driving member, of an accelerating device having parts thereof mounted on said members and arranged to accelerate said driven member through the combined influence of induction and friction, and a coupling device also having the parts thereof mounted on said members and arranged to connect said members after the driven member of the clutch has attained substantially full speed.

3. The combination with a hub, of two members of a clutch mounted thereon, a second hub and two members of a clutch mounted thereon and arranged to coöperate with the other two members, one set of said clutch members being arranged to accelerate the driven member of the clutch and the other set of clutch members being arranged to positively connect the two members of the clutch after the driven member has attained full speed.

4. In a clutch, the combination with a driven member carrying an armature, and a field member and a driving member carrying an armature and a field member, said members being arranged to coöperate with the members mounted on the driven member of the clutch.

5. In a magnetic clutch the combination with one member comprising a hub, a pair of radially yielding supports carried by said hub and one member of a magnetic clutch carried by each of said supports, of a second member of the clutch comprising a hub carrying the coöperating members of the magnetic clutches.

6. In a clutch, the combination with means for gradually accelerating the driven member of a clutch, of separate and independent means for coupling said clutch members after the driven member of the clutch has attained full speed.

7. In a clutch, the combination with means for gradually accelerating the driven member through the combined influence of induction and friction, and separate independent means for coupling the two members of the clutch after the driven member has attained substantially full speed.

8. In a clutch, the combination with means for accelerating the driven member thereof through the combined influence of induction and friction and separate independent magnetic means for positively coupling the members of the clutch after the driven member has attained substantially full speed.

9. A clutch having the members thereof provided with two field magnets and two armatures mounted on a single pair of hubs, and means to cause a gradual acceleration of one of the members of the clutch, the driven member, when one of said armatures is attracted to its field magnet.

10. A clutch having the members thereof provided with two field magnets and two armatures, said armatures being separate and independent of each other; one of said field magnets comprising a back plate, a ring having a plurality of inwardly projecting pole pieces, a ring having a plurality of outwardly projecting pole pieces, and an annular winding interposed between said rings, and the other field magnet, comprising a plate having a recess therein and a restricted coil mounted in said recess.

11. In a clutch, the combination with a clutch member having a field magnet and an armature mounted on one hub, of a second clutch member having a field magnet and an armature mounted on a second hub, and means to cause a gradual acceleration of one of the members of the clutch, the driven member, when one of said armatures is attracted to its field magnet.

12. In a clutch, the combination with a clutch member having a field magnet and an armature, of a second clutch member having a field magnet and an armature, said armatures being separate and independent of each other one of said field magnets comprising a back plate, a ring having a plurality of inwardly projecting pole pieces, a ring having a plurality of outwardly projecting pole pieces, and an annular winding interposed between said rings, and the other field magnet comprising a plate having a recess therein and a magnetizing coil mounted in said recess.

13. In a clutch, the combination with a primary member mounted on one hub, of a secondary member mounted on either hub adapted to be inductively influenced thereby to create torque producing currents in said secondary member, and means mounted on said hubs for positively connecting the members of the clutch when one of the same, the driven member, has attained substantially full speed.

14. In a clutch, the combination with a primary clutch member, of a secondary member adapted to rest in physical contact therewith and to be inductively influenced thereby to create torque producing currents in said secondary member, and means for positively connecting the members of the clutch when one of the same, the driven member, has attained substantially full speed said secondary and primary members and said means being all mounted on a single pair of hubs.

15. In a clutch, the combination with a primary member, of a secondary member adapted to be inductively influenced thereby to create torque producing currents in said secondary member, and magnetic means for positively connecting the members of the clutch when one of said members, the driven member, has attained substantially full speed said secondary and said primary members and said means being all mounted on a single pair of hubs.

16. In a clutch, the combination with a primary member, of a secondary member adapted to rest in physical contact therewith and be inductively influenced thereby to create torque producing currents in said secondary member, and magnetic means for positively connecting the clutch members when one of said members, the driven member has attained substantially full speed said secondary and said primary members and said means being all mounted on a single pair of hubs.

17. In a clutch, the combination with a driving and a driven member, of means whereby said driven member is accelerated through the combined influence of induction and friction, and magnetic means to positively connect said members when one of said members, the driven member, has attained substantially full speed said accelerating means and said connecting means being all mounted on a single pair of hubs.

In witness whereof, I have hereunto subscribed my name in the presence of two witnesses.

LEWIS D. ROWELL.

Witnesses:
 WALTER E. SARGENT,
 E. P. HANNIG.